United States Patent Office 3,554,979
Patented Jan. 12, 1971

3,554,979
POLYETHERURETHANES CONTAINING N-t-BUTYL TERTIARY AMINE GROUPS IN THE CHAIN
Oliver Larry Hunt, Waynesboro, Va., assignor to E. I. du Pont de Nemours and Company, Wilmington, Del., a corporation of Delaware
No Drawing. Filed May 31, 1968, Ser. No. 733,289
Int. Cl. C08g 22/00
U.S. Cl. 260—77.5          10 Claims

ABSTRACT OF THE DISCLOSURE

Long-chain synthetic elastomeric polyether-based polyurethanes stabilized against discoloration by light and smog by having tertiary amine nitrogen in the polymer chain. The nitrogen is attached to two non-carbonyl carbon atoms in the chain, and the third attachment is a tertiary butyl group.

BACKGROUND OF THE INVENTION

This invention relates to polyurethanes, and more particularly to long-chain synthetic elastomeric polyether-based segmented polyurethanes containing tertiary amine nitrogen in the polymer chain.

It is known that spandex fibers and other articles which are based on segmented polyurethanes are subject to discoloration on exposure to atmospheric conditions. The known tendency to discolor which results in an undesirable yellowing is particularly pronounced in the case of segmented polyurethanes containing in the polymer chain recurring ureylene residues, i.e., radicals of the formula —NH—CO—NH—. If the ureylene residue is attached to a carbon atom of an aromatic ring, the tendency to discolor is even more pronounced.

In the prior art it is disclosed that the dyeability and stability of segmented polyurethanes can be improved by including tertiary amine nitrogen in the polymer chain. The nitrogen can be attached to two carbons of the polymer chain, and the third substituent is generally broadly disclosed to be an aliphatic or cycloaliphatic radical. Examples of patents with disclosures of this type are U.S. 3,376,264; U.K. 1,079,597; U.K. 1,082,938; U.K. 1,083,857, and U.K. 1,086,079. All of these patents contain examples purporting to describe actual preparation of segmented polyurethanes containing tertiary amine nitrogen. Among these, the only unsubstituted alkyl radicals exemplified as the third attachment to the tertiary amine nitrogen are methyl and ethyl.

Segmented polyurethanes containing tertiary amine nitrogen in the polymer chain, in which the third attachment to the nitrogen is methyl or ethyl, are indeed more stable to ultraviolet light and smog atmosphere than are similar segmented polyurethanes containing no tertiary amine nitrogen. However, it appears that the presence of the N-methyl or N-ethyl tertiary amine accelerates the rate of degradation of polyether-based segmented polyurethane in chlorine bleach, as judged by the deterioration of physical properties.

SUMMARY OF THE INVENTION

This invention provides long-chain synthetic elastomeric polyether-based segmented polyurethanes containing in the polymer chain tertiary amine nitrogen bonded to two non-carbonyl carbon atoms and further bonded to a t-butyl group, hereinafter referred to as N-t-butyl. These segmented polymers contain recurring units of the formula:

wherein G is the residue remaining after removal of the terminal hydroxyl groups from a polyalkylene ether glycol having a molecular weight above about 600 and a melting point below 50° C., R, R′, and R″ are all divalent organic radicals. At least some of the radicals of R′ and/or R″ contain N-t-butyl, m and p are integers of 1 to about 8, and n is zero or an integer of 1 to about 8. R can be aliphatic, aromatic, cycloaliphatic, or araliphatic. R′ and R″ can be aliphatic, cycloaliphatic or araliphatic. These segmented polyurethanes are resistant to discoloration upon exposure to light and smog, and degrade more slowly in chlorine bleaches than do similar polymers containing N-methyl or N-ethyl groups. Molecular weight of these polymers is in the fiber forming range, as indicated by intrinsic vicosities above 0.6. The amount of tertiary amine nitrogen attached to t-butyl is at least 0.014% by weight, which corresponds to 10 milliequivalents of nitrogen per kilogram of segmented polyurethane.

DETAILED DESCRIPTION

Segmented polyurethanes are generally prepared from hydroxyl-terminated prepolymers, such as hydroxyl-terminated polyethers, of low molecular weight. Reaction of the prepolymer with a stoichiometric excess of organic diisocyanate produces an isocyanate-terminated polymeric intermediate which may then be chain-extended with a difunctional, active hydrogen-containing compound, such as hydrazine, organic diamines, and dihydrazides. These segmented polyurethanes are well known in the art and are described in several patents, among which are U.S. Pats. 2,929,804; 2,957,852; 3,040,003; 3,379,675 and German Pat. 1,123,467, the disclosures of which are incorporated herein by reference.

Various procedures may be used for incorporating N-t-butyl groups into polyether-based segmented polyurethanes. One method is to add a glycol containing N-t-butyl to the polyalkylene ether glycol at the time of reaction with the organic diisocyanate. Another is to use a chain-extender (or co-chain-extender) or chain terminator containing N-t-butyl.

Among the N-t-butyl-containing glycols which can be used are the N-t-butyldialkanolamines such as N-t-butyldiethanolamine. The latter compound is commercially available, or it can be prepared by reaction of t-butylamine with ethylene oxide. Higher homologs can be obtained by reaction of t-butylamine with an alkylene oxide. For example, 4-t-butyl-4-aza-2,6-heptanediol may be obtained by reaction of t-butylamine and propylene oxide.

Among the N-t-butyl-containing diamines which can be used are the N-t-butylalkylenetriamines, such as N-t-butyldiethylenetriamine. The latter compound may be prepared by reaction of N-t-butyldiethanolamine with thionyl chloride followed by reaction of the dichloride with ammonia. Higher homologs can be obtained by similar reaction of the corresponding glycols. For example, 4-t-butyl-4-aza-2,6-diaminoheptane may be prepared from 4-t-butyl-4-aza-2,6-heptanediol.

The other reactants used in preparing the segmented polyurethanes of this invention are conventional. The polyalkylene ether glycols consist essentially of divalent hydrocarbon groups of 2 to about 10 carbon atoms each joined by intra-linear ether-oxygen atoms. Preferred is polytetramethylene ether glycol.

Diisocyanates used include aliphatic diisocyanates, such as ethylene diisocyanate, trimethylene diisocyanate, and hexamethylene diisocyanate, and other higher members of this homologous series. Branched chain aliphatic

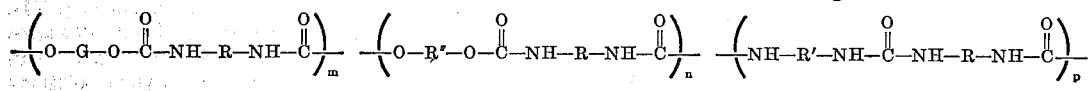

diisocyanates such as 3-methylhexane - 1,6 - diisocyanate and 3,3'-dimethylpentane-1,5 - diisocyanate can be used. Cycloaliphatic diisocyanates which are suitable include 1,3- and 1,4-cyclohexylene diisocyanates and 4,4'-methylenedicyclohexyl diisocyanate. Among the aromatic diisocyanates which can be used are p- and m-phenylene diisocyanate, 4,4' - biphenylene diisocyanate, 4,4' - methylenediphenyl diisocyanate, and 3,3' - dimethoxy - 4,4'-biphenylene diisocyanate. Araliphatic diisocyanates include m- and p-xylene diisocyanates and $\alpha,\alpha,\alpha',\alpha'$-tetramethyl-p-xylylene diisocyanate.

Chain-extenders used in preparing the polymers of this invention are hydrazine, organic diamines, and dihydrazides of organic dicarboxylic acids. Suitable organic diamines include aliphatic diamines such as ethylene diamine and hexamethylene diamine, cycloaliphatic diamines such as 1,3-cyclohexylene diamine and 4,4'-methlenedicyclohexyl diamine, and araliphatic diamines such as m-xylylenediamine and $\alpha,\alpha,\alpha',\alpha'$-tetramethyl-p-xylylene diamine. Dihydrazides useful as chain-extenders include carbohydrazide and dihydrazides of aliphatic, cycloaliphatic and aromatic dicarboxylic acids, such as oxalic, glutaric, adipic, succinic, bibenzoic, terephthalic, and hexahydroterephthalic acids.

Mixtures of chain extenders, as well as mixtures of diisocyanates and mixtures of polyalkylene ether glycols can also be used.

The above lists are intended to be exemplary, not exhaustive. The structures of R, R' and R" are not critical to the invention, except for the requirement that at least a portion of at least one of them contain N-t-butyl. Otherwise the only requirements are the obvious ones, such as that they be free of substituents which would interfere with the polymerization reaction or which would discolor the polymer, or the like. In addition, R and R' should chosen be such that the unit $$\{NH-R'-NH-\overset{O}{\underset{\|}{C}}-NH-R-NH-\overset{O}{\underset{\|}{C}}\}$$

represents one repeating unit of a linear urea polymer which in its fiber-forming molecular weight range has a melting point above 200°C.

To provide the benefits of this invention there should be at least 10 meq. of nitrogen present in N-t-butyl groups per kilogram of segmented polyurethane, which is equivalent to 0.014 weight percent of such nitrogen. Preferably, the amount of such nitrogen is at least 0.05% by weight. Amounts in excess of about 0.56% (400 meq./kg.) provide no additional advantage and are mere surplusage.

Segmented polyurethanes of this invention are of fiber-forming molecular weight, as indicated by intrinsic viscosities of at least 0.6. Intrinsic viscosity is the limiting value, as the concentration approaches zero, of the expression

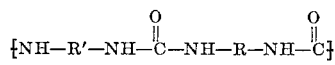

wherein $\eta$ is the viscosity of a dilute solution of the polyurethane, $\eta_0$ is the viscosity of the solvent in the same units and at the same temperature, and $c$ is the concentration in grams of the polyurethane per 100 ml. of solution. The intrinsic viscosities referred to herein are measured in hexamethylphosphoramide at 25° C.

The segmented polyurethanes of the invention can be spun in the usual manner to provide spandex fibers, and elastomeric films can be cast from solutions of the polymer.

This invention will be further illustrated, but is not intended to be limited, by the following examples in which parts and percentages are by weight unless otherwise specified.

In the examples, the test for smog discoloration is performed by exposing film samples to atmospheric pollutants generated in a laboratory test chamber. Samples of the film are exposed for twelve hours to synthetic atmosphere generated from a gaseous mixture of seven parts per million nitrogen dioxide, two parts per million sulfur dioxide, and eight parts per million-2-pentene in air (all parts by volume) by irradiating with eight "Black" fluorescent tubes (G.E. Type F3OT8BL). A detailed procedure and description of the Scott Controlled Atmospheric Tester used is found in the Du Pont Technical Information Bulletin L-33 of the Textile Fibers Department Technical Service Section, E. I. du Pont de Nemours & Company, Inc., Wilmington, Del. This synthetic atmosphere has been found to simulate a "photochemical smog," thereby providing an accelerated discoloration test for reproducibly discoloring spandex yarn. It has been found that the color development obtained on exposure of samples in the laboratory test for twelve hours correlates well with a six-week exposure of elastic fabrics in Los Angeles, Calif., as area well known for smog problems.

The degree of yellowness, referred to in the example as $b$ value, is determined from colorimetric data obtained by analyzing film samples which are about three inches square. The reflectance ratios of the samples in the green and blue filter settings of a colorimeter are measured, using a Model IV Color Master Differential Colorimeter, manufactured by Manufacturers Engineering and Equipment Corporation, Hatboro, Pa., and calibrated against the manufacturer's standard reference plates and the National Bureau of Standards' certified reflectance plates. The $b$ values are calculated from the average of three readings, using the following formula $$b=42.34(G^{1/3}-B^{1/3})$$

where G represents the reflectance ratio with the green filter and B represents the reflectance ratio with the blue filter.

The test for chlorine degradation is performed by attaching film samples to hollow, rectangular frames of Mylar® polyester. The films are heated for 10 minutes at 150° C. and are boiled-off for 60 minutes prior to testing. The films are immersed for 20 minutes in an aqueous solution at 70° C. prepared by mixing 5.0 ml. of Chloro® (a hypochlorite bleach), 500 ml. of water, 1.0 gram of Tide® (an anionic detergent), and sufficient 0.1 N hydrochloric acid to give a pH of 8.5 measured at 25° C. The films are then rinsed with cold water and dried for 20 minutes at 70° C. The stress ("power") of the film samples at 400% elongation and the elongation at break are measured before and after the exposure to chlorine bleach.

EXAMPLE I 100 grams of an isocyanate-terminated polyether prepolymer containing 3.27% NCO prepared as described in Example I of U.S. Pat. 3,149,998 is dissolved in 200 grams of N,N-dimethylacetamide and chain extended with a 102 gram portion of a solution prepared by dissolving 2.8 grams of 4-t-butyl-4-aza-2,6-diaminoheptane, 0.51 gram of diethylamine and 7.2 grams of an 80/20 molar mixture of ethylenediamine and 1,3-cyclohexylenediamine in 300 grams of N,N-dimethylacetamide. The product (A) has an intrinsic viscosity of 1.39 and contains 50±2 milliequivalents of tertiary amine nitrogen per kilogram of segmented polyurethane. A second polymer (B) is prepared as above except that all of the 80/20 mixture of ethylene diamine and 1,3-cyclohexylenediamine is replaced with 4-t-butyl-4-aza-2,6-diaminoheptane. The product contains 350±10 milliequivalents of tertiary amine nitrogen per kilogram of segmented polyurethane. A third segmented polyurethane (C) is prepared as in part A except that a stoichiometrically equivalent amount of 3-t-butyl-3-aza-1,5-diaminopentane is used in the place of 4-t-butyl-4-aza-2,6-diaminoheptane. The product contains 50±2 milliequivalents of tertiary amine nitrogen per kilogram of segmented polyurethane and has an intrinsic viscosity of 1.57. The polymer solutions are cast on Mylar® polyester sheets using a 7 mil doctor blade giving films having a thickness of 1.1±0.3 mils after drying at 50° C. for about 12 hours. The b values of the films are determined both before and after exposure in the smog discoloration test. Results are tabulated below.

|  | b values | | |
| --- | --- | --- | --- |
|  | As prepared | After exposure | Δ b |
| Sample: | | | |
| A | 2.5 | 13.5 | 11.0 |
| B | 2.4 | 5.2 | 2.8 |
| C | 2.5 | 14.9 | 12.4 |

Other samples of the films are cut into strips of equal width and attached to Mylar® polyester frames as described hereinabove for the chlorine degradation test. Results are tabulated below.

|  | Power (g.) | | Percent power retained |
| --- | --- | --- | --- |
|  | As prepared | After exposure | |
| Sample: | | | |
| A | 150 | 94 | 63 |
| B | 40 | 14 | 35 |
| C | 160 | 60 | 37 |

EXAMPLE II

An isocyanate-terminated prepolymer is prepared by adding 70.0 grams of 45° C. p,p'-methylenediphenyl diisocyanate to a 60° C. mixture of 268 grams of 1830 molecular weight polytetramethylene ether glycol and 2.8 grams of 3-t-butyl-3-aza-1,5-pentanediol and then heating and stirring the resulting mixture 1.5 hours at 85° C. One hundred grams of the cooled isocyanate-terminated prepolymer containing 64.4 milliequivalents of isocyanate is dissolved in 175 grams of N,N-dimethylacetamide and chain extended with a 52 gram portion of a solution prepared by dissolving 0.70 ml. (0.50 gram) of diethylamine and 5.20 ml. (4.73 grams) of an 80/20 molar mixture of ethylenediamine and 1,3-cyclohexylenediamine in 105 grams of N,N-dimethylacetamide. The product (A) has an intrinsic viscosity of 1.02 and contains 50±2 milliequivalents of tertiary amine nitrogen per kilogram of segmented polyurethane. A second polymer (B) is prepared as in part A except that an equivalent amount (3.3 grams) of 4-t-butyl-4-aza-2,6-heptanediol is substituted for the previously used 3-t-butyl-3-aza-1,5-pentanediol. Polymer B has an intrinsic viscosity of 1.15 and contains 50±2 milliequivalents of tertiary amine nitrogen per kilogram of segmented polyurethane. To each sample is added a resinous condensate of p-cresol and divinylbenzene having a molecular weight of about 2300 such that the final mixture contains 1.2% of the resinous condensate based on the segmented polyurethane. The samples are cast into films and tested as in Example I. The following results are obtained:

SMOG DISCOLORATION TEST

|  | b values | | |
| --- | --- | --- | --- |
|  | As prepared | After exposure | Δ b |
| Sample: | | | |
| A | 2.6 | 8.8 | 6.2 |
| B | 2.5 | 9.3 | 6.8 |

CHLORINE DEGRADATION TEST

|  | Power (g.) | | Percent power retained |
| --- | --- | --- | --- |
|  | As prepared | After exposure | |
| Sample: | | | |
| A | 165 | 60 | 36 |
| B | 160 | 82 | 51 |

What is claimed is:

1. A long-chain, fiber-forming, synthetic elastomeric polyether-based segmented polyurethane containing in the polymer chain tertiary amine nitrogen bonded to two non-carbonyl carbon atoms and further bonded to a t-butyl group, said polyurethane, having an intrinsic viscosity above 0.6 as measured at 25° C. in hexamethylphosphoramide, comprising repeating units of the formula:

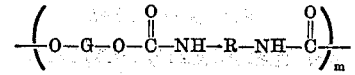

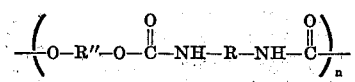

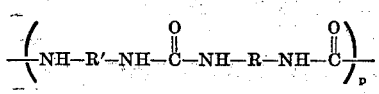

wherein G is the residue remaining after removal of the terminal hydroxyl groups from a polyalkylene ether glycol having a molecular weight above about 600 and a melting point below 50° C., R is an aliphatic, aromatic, cycloaliphatic, or araliphatic radical, R' and R" are aliphatic, cycloaliphatic, or araliphatic radicals, at least some of the radicals R' and R" contain said tertiary amine nitrogen bonded to t-butyl such that the polyurethane contains a sufficient amount of such nitrogen per kilogram of polyurethane to stabilize said polyurethane against discoloration, m and p are integers of 1 to about 8, and n is zero or an integer of 1 to about 8, R and R' are chosen such that the unit

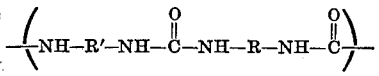

represents one repeating unit of a linear urea polymer which in its fiber-forming molecular weight range has a melting point above 200° C.

2. Polyurethane of claim 1 wherein the amount of tertiary amine nitrogen which is attached to t-butyl is between about 35 and 400 milliequivalents per kilogram of polyurethane.

3. Polyurethane of claim 2 wherein n is zero and at least a portion of R' is

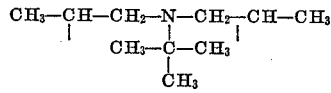

or

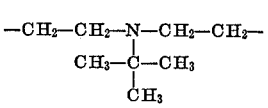

4. Polyurethane of claim 3 wherein G is the residue remaining after removal of the terminal hydroxyl groups from polytetramethylene ether glycol, a portion of R' is ethylene and a portion is 1,3-cyclohexylene, and

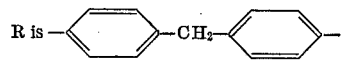

5. Polyurethane of claim 2 wherein n is an integer of 1 to 8 and R" is

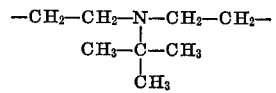

or

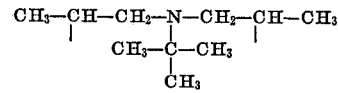

6. Polyurethane of claim 5 wherein G is the residue remaining after removal of the terminal hydroxyl groups from polytetramethylene ether glycol, a portion of R' is ethylene and a portion is 1,3-cyclohexylene, and

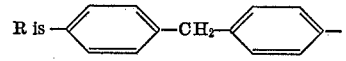

7. A fiber of a polyurethane of claim 1.
8. A fiber of a polyurethane of claim 4.
9. A fiber of a polyurethane of claim 6.
10. A film of a polyurethane of claim 1.

References Cited

UNITED STATES PATENTS

| | | | |
|---|---|---|---|
| 3,040,003 | 6/1962 | Beaman | 260—77.5 |
| 3,149,998 | 9/1964 | Thurmaier | 117—138.8 |
| 3,180,853 | 4/1965 | Peters | 260—77.5 |
| 3,357,954 | 12/1967 | Kirkaldy | 260—75 |
| 3,388,100 | 6/1968 | Thoma et al. | 260—75 |
| 3,461,101 | 8/1969 | Oertel et al. | 260—75 |
| 3,461,102 | 8/1969 | Oertel et al. | 260—75 |
| 3,351,608 | 2/1964 | Oertel et al. | |
| 3,376,264 | 5/1965 | Wieden et al. | |

FOREIGN PATENTS

| | |
|---|---|
| 1,072,081 | Great Britain. |
| 1,079,597 | Great Britain. |
| 1,082,938 | Great Britain. |
| 1,083,857 | Great Britain. |
| 1,086,079 | Great Britain. |

DONALD E. CZAJA, Primary Examiner

H. S. COCKERAM, Assistant Examiner

U.S. Cl. X.R.

260—75